UNITED STATES PATENT OFFICE.

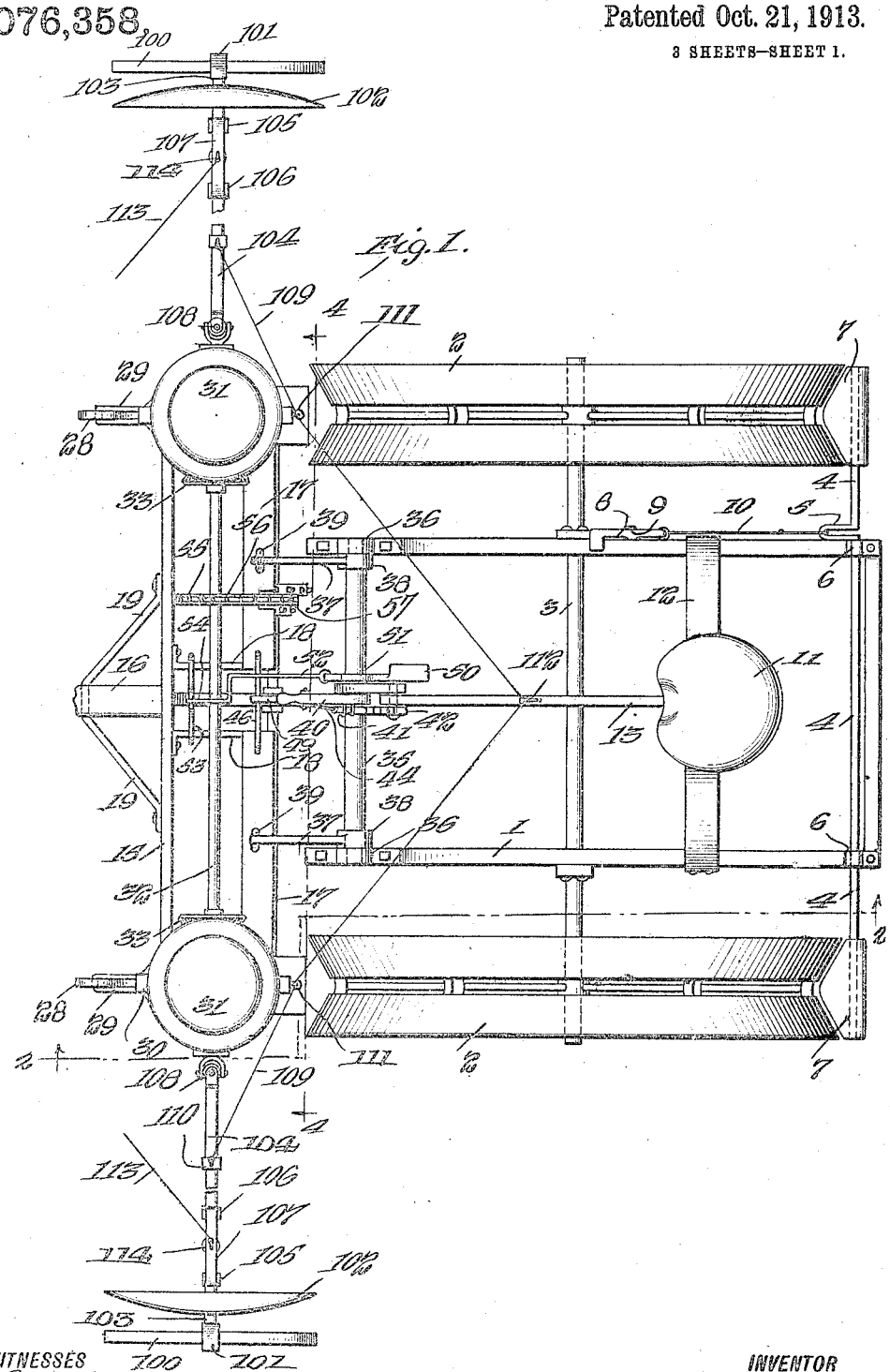

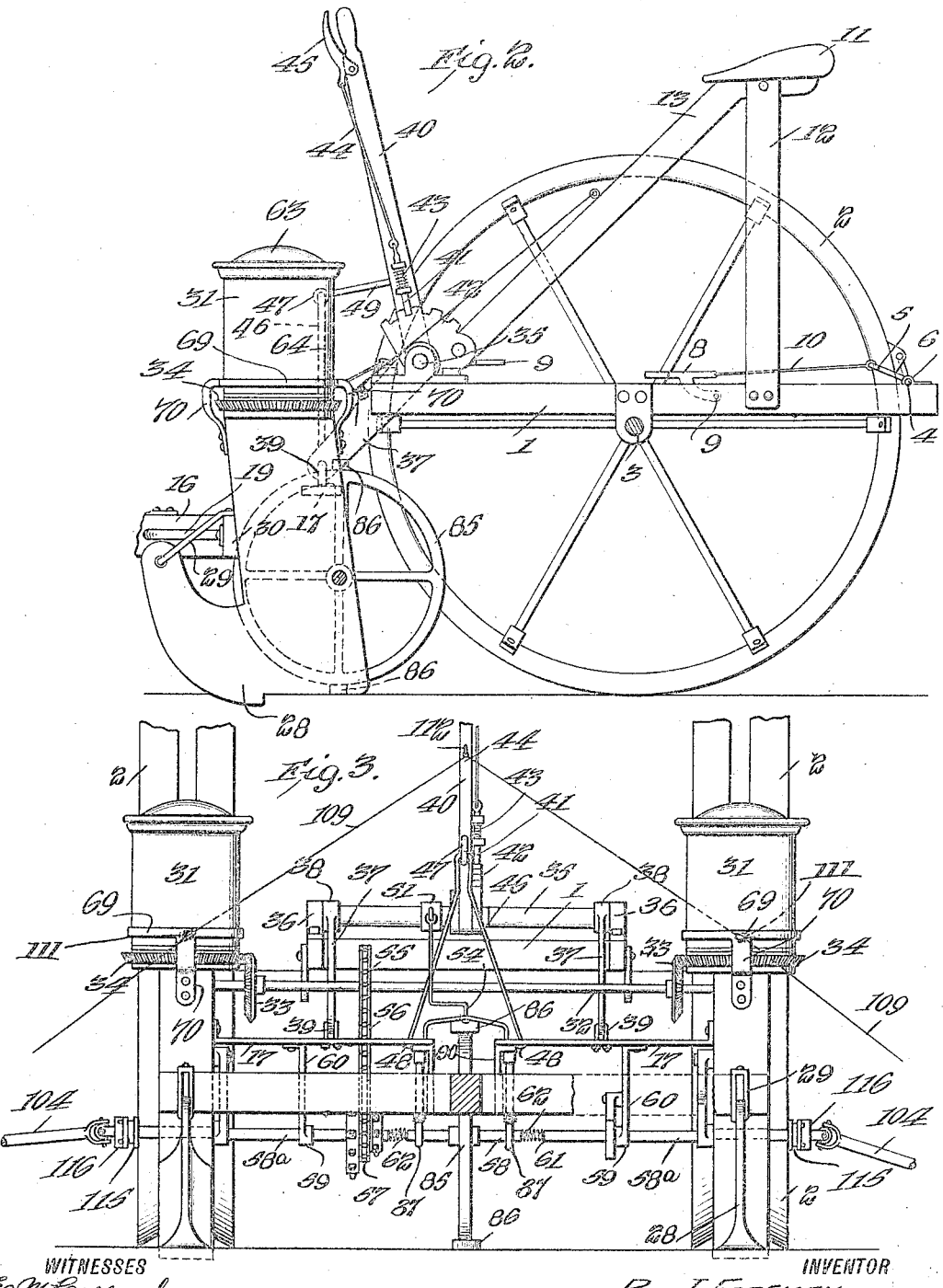

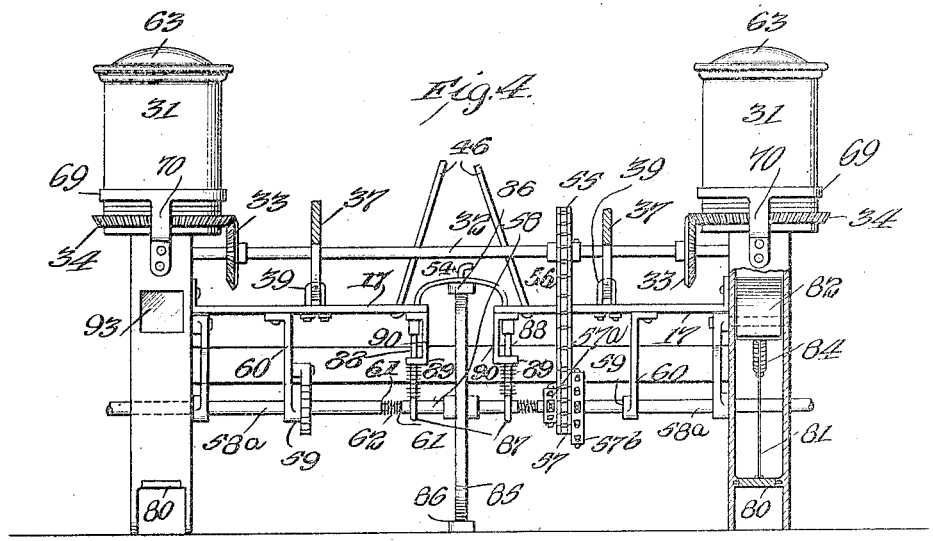

ROY I. FOREMAN, OF WATSEKA, ILLINOIS.

CHECK-ROW PLANTER.

1,076,358. Specification of Letters Patent. Patented Oct. 21, 1913.

Application filed January 20, 1912. Serial No. 672,268.

*To all whom it may concern:*

Be it known that I, ROY I. FOREMAN, a citizen of the United States, and resident of Watseka, in the county of Iroquois, State of Illinois, have invented a new and useful Improvement in Check-Row Planters, of which the following is a specification.

My invention is an improvement in check row planters, and has for its object the provision of simple, easily operated means for tripping the seed valves to cause the planter to drop a charge of seed at regular predetermined intervals without the use of a knotted wire, the said means being operated by the movement of the machine through the field.

In the drawings: Figure 1 is a plan view of the improvement; Fig. 2 is a section on the line 2—2 of Fig. 1; Fig. 3 is a front view; Fig. 4 is a section on the line 4—4 of Fig. 1; Fig. 5 is a side view of a runner and seed box with parts broken away; and Fig. 6 is a top plan view of one of the markers or indicators.

In the present embodiment of the invention the frame 1 of the machine is supported by the usual covering wheels 2 secured on the axle 3 journaled transversely of the frame. A shaft 4 provided with a crank arm 5 is journaled in bearings 6 at the rear of the frame, and to each end of the shaft is secured a scraper blade 7 shaped at its free edge to fit the periphery of the wheel, and the shaft may be oscillated to bring the blades into or out of engagement with the wheels.

A treadle lever 8 is pivoted to the frame at 9, and a link 10 connects the lever to the crank arm 5, so that when the lever is swung by the foot of the operator the shaft will be moved to operate the scrapers. A seat 11 is supported between and above the wheels by means of an arch plate 12 and a forwardly extending brace 13.

An auxiliary or runner frame is arranged in front of the main frame, the said frame comprising a front cross plate 15 to which is connected a tongue bar 16 at the center of the plate, and rear plates 17, one at each side of the tongue, and in alinement and connected to the front plate at their inner ends by bracket arms 18. The tongue bar 16 is braced to the front plate by braces 19.

A runner or furrow opener 28 is connected to each end of the front plate 15 and to the outer end of the adjacent rear plate 17, and a link 29 connects the front end of each runner to the adjacent end of a cross bar 30 connecting the front and rear bars. A seed box 31 is arranged above each runner, and a shaft 32 is journaled between the front and rear plates and is provided at each end with a bevel gear wheel 33 meshing with a bevel gear wheel 34 which operates the feeding or dropping mechanism in the seed box.

The auxiliary frame supporting the runners and seed boxes is connected to the main frame by means of a shaft 35 journaled transversely in bearings 36 at the front of frame 1, and the shaft is provided with forwardly extending arms 37, one at each end thereof. Each arm is provided with a bearing 38 engaging the shaft, and at its forward end each arm is connected to a loop 39 on the adjacent rear plate 17. The shaft is operated by means of a lever 40 secured thereto to raise or lower the front ends of the arms, and the rear end of the auxiliary frame. The lever is held in adjusted position by means of a latch 41 slidable on the lever and pressed into engagement with a toothed quadrant 42 on the main frame by a spring 43. The latch is operated by a latch lever 45 pivoted on the lever and connected to the latch by a link 44. The lever is also connected to the adjacent or meeting ends of the rear plates 17 by means of a yoke or bail 46. The body of the bail engages an eye 47 in the front or outer end of an arm 49 extending forwardly from the lever, and the bail arms are passed downwardly through openings in the inner ends of plates 17 and are headed below the plates, as shown at 48.

A treadle lever 50 is pivoted on shaft 35 by means of a bearing 51 intermediate the ends of the lever, and a link 52 connects the front end of the lever to the body of a yoke or bail 53 whose arms are connected to the bracket arms 18 before mentioned. The end of the link adjacent to the yoke or bail is offset laterally inward, as shown at 54.

The shaft 32 is provided with a sprocket wheel 55 near one end, and a chain 56 connects the said wheel to a wheel 57 on one section 58ª of a sectional shaft 58—58ª journaled in bearings 59, in hangers 60, depending from the plates 17. The sectional shaft is composed of the central section 58 and end sections 58ª. Each shaft section 58ª is provided with a reduced portion 61 at its inner end, and the section 58 has a similar portion 61 at each end. A coil spring 62 connects the section 58 to each section 58ᵃ, the ends of the springs fitting over the reduced portions.

Each seed box 31 is provided with the usual cover 63, and the bottom of the box has the usual feed opening, not shown, and the gear wheel 34 is the dropping disk.

The seed is first dropped from the feed box onto an inclined plate 82, which is provided with a transverse bearing 83 at approximately the center of its under face. The bearing is secured on a shaft 82ᵃ journaled in the runner, and a coil spring 84 connected at one end to the runner wall and at the other to the lower end of the plate, acts normally to hold the plate in the position of Fig. 5. The outer end of each shaft section 58ᵃ extends into the adjacent runner, and a pair of oppositely extending radial arms 90 is secured to the shaft section adjacent to the runner. An arm 91 is secured to each shaft 82ᵃ and is adapted to be engaged by the arm 90 to trip the plate 82. The link 81 before mentioned connects valve 80 to plate 82, so that when the said plate 82 is tripped, valve 80 is opened. An opening 92 is provided in the rear wall of the runner adjacent to plate 82, and a pane or sheet 93 of transparent material is arranged in the opening. This arrangement leaves the grain in sight of the operator, so that he can see at once and remedy any defect or fault in the dropping mechanism.

The shaft sections 58ᵃ are operated to trip the valves at regular predetermined intervals by means of a measuring wheel 85 secured to the central section 58. The said wheel is preferably four inches in width and seven feet in circumference and is designed to trip the dropping valves twice during each rotation, so that the hills will be three feet six inches apart in the row. The periphery of the wheel is provided with transversely arranged marking lugs 86 at diametrically opposite points, and is also preferably provided with transverse cleats (not shown) to prevent slipping. The shaft section 58 is supported in bearings 87 on the lower ends of rods 88 mounted to slide in bearing lugs 89 on plates 90, depending below the inner ends of the plates 17. The shaft and wheel may thus yield with respect to the frame, and the springs 62 permit the said shaft and wheel to yield with respect to sections 58ᵃ.

One of the shaft sections 58ᵃ is provided with three sprocket wheels 57—57ᵃ and 57ᵇ of different sizes, of which the wheel 57 is the intermediate, and the chain 56 may be engaged with either of the wheels to rotate the shaft 58—58ᵃ at different speeds with respect to shaft 32 to provide for difference in drilling or planting.

In operation, the seed boxes being supplied with seed, the machine is drawn through the field with the measuring wheel running on the ground. The seed plates, that is, the gear wheels 34, drop seed onto the seed valves 82 until a specified number of seed is held on each valve. At this time arm 90 on shaft 58ᵃ strikes arm 91 on shaft 82ᵃ and the valve is tilted to drop the seed into the furrow opened by the adjacent runner. Valve 80 is opened by valve 82, and at the same time, the seed may drop entirely clear of the runner. The covering wheels 2 cover the seed in the furrow, and the lugs 86 mark the position of the hills.

A marker for indicating the next row is provided at each side of the planter. Each marker consists of a wheel 100 of the same size as the measuring wheel 85 and is provided with marking lugs 101 spaced in the same manner as the lugs 86 of the measuring wheel. A concave disk 102 is arranged adjacent to each wheel 100 and both disk and wheel are secured to a stub shaft 103. Each stub shaft 103 is connected to a connecting shaft 104, by means of a universal joint 104ᵃ. The adjacent ends of the shafts 103—104 are journaled in bearings 105 and 106 respectively, on a bracket arm 107. The inner end of each shaft 104 is connected to the outer end of the adjacent shaft section 58ᵃ by means of a universal joint 108. Both shafts 104 are connected together and to the brace 13 before mentioned, by means of a chain, wire, or other flexible member 109. The ends of the member are connected to collars 110 on the shafts 104, and the central portion of the member is connected to an eye 112 on the said brace 13. The member near each end passes through an eye 111 on the adjacent seed box. By means of the member 109 either indicator may be lifted into inoperative position. But one indicator is used at a time and the indicator not in use is arranged in approximately vertical position, leaning against the adjacent seed box. A wire 113 is connected with each bracket 107 by means of an eye 114 on the bracket, and the other end of each wire extends forwardly and inwardly to a connection with the front part of the machine.

The indicators are normally out of gear with the shaft sections 58ᵃ and are connected thereto by means of the clutch shown in Fig. 3. The said clutch comprises a section 115 journaled loosely on the end of the shaft section 58ᵃ and adapted to be engaged by the other section 116 of the clutch which is secured to the shaft section but is slidable thereon into and out of engagement with the section 115. It will be understood that when either indicator is in operative position it is disconnected from the shaft section 58ᵃ. The chain 109 is of such length that when the indicator is in operative position the chain is exactly taut. The movable clutch section is operated by the usual mechanism.

I claim:

1. In a planter, a main frame, an axle journaled transversely thereof, wheels on the axle, an auxiliary frame at the front of the main frame, a seed box at each end thereof, a runner supported by the auxiliary frame below each seed box, each runner being in front of the adjacent wheel, means on the main frame engaging the auxiliary frame for raising and lowering the auxiliary frame, dropping plates rotatable between each seed box and the runner, a normally closed dropping valve in each runner, a shaft journaled in the auxiliary frame between the seed boxes, a driving connection between each dropping plate and the adjacent end of the shaft, a sectional shaft journaled between the runners and comprising a central and end sections, each end section having its outer end journaled in the adjacent runner, an arm on each valve for opening the same, a tripping arm on each of the end sections of the shaft for engaging said arm to trip the valve, a yielding connection between the central section and each end section, a driving connection between the sectional shaft and the dropping plate operating shaft, means for supporting the central section for yielding movement toward and from the auxiliary frame, and means for rotating the central section.

2. In a planter, a main frame, an axle journaled transversely thereof, wheels on the axle, an auxiliary frame at the front of the main frame, a seed box at each end thereof, a runner supported by the auxiliary frame below each seed box, each runner being in front of the adjacent wheel, means on the main frame engaging the auxiliary frame for raising and lowering the auxiliary frame, dropping plates rotatable between each seed box and the runner, a normally closed dropping valve in each runner, a shaft journaled in the auxiliary frame between the seed boxes, a driving connection between each dropping plate and the adjacent end of the shaft, a sectional shaft journaled between the runners and comprising a central and end sections, each end section having its outer end journaled in the adjacent runner, an arm on each valve for opening the same, a tripping arm on each of the end sections of the shaft for engaging said arm to trip the valve, a yielding connection between the central section and each end section, a driving connection between the sectional shaft and the dropping plate operating shaft, and means for rotating the central section.

3. In a planter, a main frame, an axle journaled transversely thereof, wheels on the axle, an auxiliary frame at the front of the main frame, a seed box at each end thereof, a runner supported by the auxiliary frame below each seed box, each runner being in front of the adjacent wheel, means on the main frame engaging the auxiliary frame for raising and lowering the auxiliary frame, dropping plates rotatable between each seed box and the runner, a normally closed dropping valve in each runner, a shaft journaled in the auxiliary frame between the seed boxes, a driving connection between each dropping plate and the adjacent end of the shaft, a sectional shaft journaled between the runners and comprising a central and end sections, each end section having its outer end journaled in the adjacent runner, a connection between each end section and the adjacent valve for tripping the valve at spaced intervals, means on the central section for rotating the same, a yielding connection between the central section and each end section, and a yielding connection between the central section and the auxiliary frame.

4. In a planter, a main frame, an axle journaled transversely thereof, wheels on the axle, an auxiliary frame at the front of the main frame, a seed box at each end thereof, a runner supported by the auxiliary frame below each seed box, each runner being in front of the adjacent wheel, means on the main frame engaging the auxiliary frame for raising and lowering the auxiliary frame, dropping plates rotatable between each seed box and the runner, a normally closed dropping valve in each runner, a shaft journaled in the auxiliary frame between the seed boxes, a driving connection between each dropping plate and the adjacent end of the shaft, a sectional shaft journaled between the runners and comprising a central and end sections, each end section having its outer end journaled in the adjacent runner, a connection between each end section and the adjacent valve for tripping the valve at spaced intervals, means on the central section for rotating the same, and a yielding connection between the central section and each end section.

5. In a planter, a main frame, an axle journaled transversely thereof, wheels on the axle, an auxiliary frame at the front of the main frame, a seed box at each end thereof, a runner supported by the auxiliary frame below each seed box, each runner being in front of the adjacent wheel, means on the main frame engaging the auxiliary frame for raising and lowering the auxiliary frame, dropping mechanism below each seed box and the runner, a sectional shaft comprising a central and end sections, each end section having its outer end adjacent to a seed box, a flexible connection between the central section and each end section, a yielding connection between the central section and the auxiliary frame, a connection between each end section and the dropping mechanism for operating the same, and a measuring wheel on the central section.

6. In a planter, a main frame, an auxiliary frame in front of the main frame, means on the main frame for raising and lowering the auxiliary frame, a seed box at each end of the auxiliary frame, a runner supported by the said frame below each seed box, dropping mechanism between each runner and the seed box, a sectional shaft comprising a central section, and an end section adjacent to each seed box, a yielding connection between each end section and the central section, an operating connection between each end section and the dropping mechanism, a yielding connection between the central section and the auxiliary frame, a measuring wheel on the central section, and a covering wheel on the main frame behind each runner.

7. In a planter, a main frame, a dropping mechanism at each side of the frame, a measuring wheel provided with spaced lugs on its periphery for indicating the location of the dropped seed in the row, said wheel being journaled on the frame for operating the dropping mechanisms, an indicator wheel at each side of the frame, each of the said wheels corresponding in size to the measuring wheels, lugs on each of the indicator wheels in alinement with the lugs of the measuring wheel, and a driving connection between the measuring wheel and each of the indicator wheels, each of the said driving connections comprising a stub shaft on which the indicator wheel is secured, a connecting shaft between the stub shaft and the measuring wheel, a universal joint connection between the stub shaft and the connecting shaft, and a universal joint connection between the connecting shaft and the measuring wheel.

8. In a planter, a main frame, a dropping mechanism at each side of the frame, a tripping device for each of the said mechanisms, a measuring wheel provided with spaced lugs on its periphery for indicating the location of the dropped seed in the row, said wheel being journaled on the frame for operating the tripping mechanisms, an indicator wheel at each side of the frame, each of the said wheels corresponding in size to the measuring wheel, lugs on each of the indicator wheels in alinement with the lugs of the measuring wheel, and a driving connection between the measuring wheel and each of the indicator wheels, said mechanism being connected to the indicator wheels to permit the said wheels to be swung into and out of operative position.

ROY I. FOREMAN.

Witnesses:
 Geo. Gerdes,
 J. O. Bailey.

Copies of this patent may be obtained for five cents each, by addressing the "Commissioner of Patents. Washington, D. C."